(12) United States Patent
Larson et al.

(10) Patent No.: US 7,510,391 B2
(45) Date of Patent: *Mar. 31, 2009

(54) APPARATUS FOR EXTRUSION BLOW MOLDING A CONTAINER

(75) Inventors: Craig A. Larson, Howell, MI (US);
Gary Ferguson, Tallmadge, OH (US);
Duane Lach, Westland, MI (US);
William A. Slat, Brooklyn, MI (US);
James Kulp, Dexter, MI (US); Gary I. Voss, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/539,759

(22) Filed: Oct. 9, 2006

(65) Prior Publication Data

US 2007/0087076 A1     Apr. 19, 2007

Related U.S. Application Data

(62) Division of application No. 10/677,196, filed on Oct. 2, 2003, now Pat. No. 7,150,371.

(51) Int. Cl.
*B29C 49/48* (2006.01)
*B29C 49/50* (2006.01)
(52) U.S. Cl. .................. 425/525; 425/531; 425/532
(58) Field of Classification Search ............... 425/461, 425/522, 525, 531, 532
See application file for complete search history.

(56) References Cited

U.S. PATENT DOCUMENTS 3,225,950 A * 12/1965 Josephson et al. ........... 215/384
3,499,071 A *  3/1970 Hurst ......................... 264/536
3,917,095 A    11/1975 Seefluth
4,188,357 A     2/1980 Go
4,307,060 A    12/1981 Go
4,315,888 A     2/1982 Hafele
4,759,454 A     7/1988 Nowicki et al.
4,812,267 A *   3/1989 Hoffmann et al. ........... 264/169
4,846,359 A     7/1989 Baird et al.
4,988,279 A     1/1991 Belcher (Continued)

FOREIGN PATENT DOCUMENTS

EP      1120224 A1 *  8/2001

(Continued)

OTHER PUBLICATIONS

Charles A. Harper, Handbook of Materials for Product Design, 2001, McGraw Hill, Third Edition, section 10.5.5.*

*Primary Examiner*—Robert B Davis
(74) *Attorney, Agent, or Firm*—Dykema Gossett PLLC

(57) ABSTRACT

An extrusion blow molded container is provided comprising a closed base, a body portion extending from the closed base having a surface finish that is substantially free of striations, and an open neck portion extending from the body portion. In an embodiment, the container is comprised of polyethylene terephthalate (PET); the base portion includes a support portion and a substantially elevated portion having a center and a major diameter; and the center is disposed an elevated distance above said surface that is less than about 0.05 the major diameter. A method and apparatus for extrusion blow molding an article is also disclosed.

22 Claims, 10 Drawing Sheets

U.S. PATENT DOCUMENTS

| | | | |
|---|---|---|---|
| 5,045,255 A | 9/1991 | Kurz | |
| 5,080,855 A | 1/1992 | Belcher | |
| 5,149,485 A | 9/1992 | Belcher | |
| 5,217,737 A | 6/1993 | Gygax et al. | |
| 5,393,871 A | 2/1995 | Yau et al. | |
| 5,433,347 A | 7/1995 | Richter et al. | |
| 5,443,868 A * | 8/1995 | Oda et al. | 428/35.7 |
| 5,460,760 A * | 10/1995 | Tsai et al. | 264/39 |
| 5,637,167 A | 6/1997 | Krishnakumar et al. | |
| 6,039,204 A * | 3/2000 | Hosokoshiyama et al. | 220/623 |
| 6,276,546 B1 | 8/2001 | Davis et al. | |
| 6,494,333 B2 | 12/2002 | Sasaki et al. | |
| 6,548,133 B2 | 4/2003 | Schmidt et al. | |
| 6,659,298 B2 | 12/2003 | Wong | |
| 6,660,216 B1 * | 12/2003 | Porter | 264/523 |
| 7,390,187 B2 * | 6/2008 | Larson et al. | 425/525 |

FOREIGN PATENT DOCUMENTS

| | | |
|---|---|---|
| WO | WO 95/32127 | 11/1995 |
| WO | WO 2004-008834 A2 | 1/2004 |

* cited by examiner

APPARATUS FOR EXTRUSION BLOW MOLDING A CONTAINER

CROSS-NOTING TO RELATED APPLICATIONS

This application is a divisional application of application Ser. No. 10/677,196, filed Oct. 2, 2003, the entire contents of which are herein incorporated by reference.

TECHNICAL FIELD

The present invention relates to an extrusion blow molded plastic container and a method and apparatus for making extrusion molded plastic articles.

BACKGROUND

Blow molded thermoplastic containers comprised of polyethylene terephthalate (PET) are predominantly made in one of two ways: (a) two-stage injection-stretch blow molding or (b) single-stage injection-stretch blow molding. Injection-stretch blow molding processes generally fit into one of two categories.

In a first type of process, a preform is injection molded, allowed to cool, stored, and is later blown to the shape of the desired article. Prior to blow molding, however, the preform is heated to its blow molding temperature. This type of process can be, inter alia, energy intensive.

In the second type of injection-stretch blow molding process, the preform is injection-molded and transferred, in a heated condition, to a blow station where it is blown. This second type of process requires less energy than the first type of process; however, both processes may be inherently limited in certain respects because the injection molding step is intermittent, i.e., the molten thermoplastic is injected as a shot into the preform mold, which is not a continuous operation. Another consideration associated with injection blow molding is the high cost of tooling and capital for the die head and preform mold. New or reworked die and preform molds are often required for each different shaped article produced because the preform from which the desired article is blown generally must meet very specific dimensional requirements to form the desired final blow molded article.

Another method for producing thermoplastic articles is extrusion blow molding. Examples of this method are disclosed in the art. In this type of process, the thermoplastic material is continuously extruded in the form of a hollow tube, segments of the tube are enclosed in a blow mold, and the desired article is blown. Compared to PET, many commonly used polymer materials, such as PETG (a copolymer of ethylene terephthalate and diethylene glycol), have comparatively limited use. Among other things, such polymer materials may have insufficient moisture impermeability, may not pass migration tests, or may not provide a desired surface finish or clarity—particularly when compared to the finish and clarity of PET articles that have been injection-stretch blow molded.

PET resins offer a number of desirable characteristics and, as taught in certain prior references, PET containers can be formed using extrusion blow molding processes. PET is an excellent molding compound for making hollow articles, such as beverage containers; possesses good impact strength; and can be formed into clear or colored articles, as desired. In addition, PET offers good fatigue resistance and therefore its uses include applications where the product is subjected to fatigue inducing conditions—such as squeeze bottles. It is known that PET containers can be produced using an extrusion blow molding process. However, because that process does not impart the same biaxial orientation as an injection-stretch blow molding process, there may be perceptible differences, such as between the surface finishes and article clarity. Therefore, it is desirable to be able to produce an extrusion blow molded container, including PET containers, which, among other things, may exhibit improved structural strength, structural integrity, surface finish and/or clarity.

SUMMARY

An extrusion blow molded container is provided comprising a closed base, a body portion extending from the closed base having a surface finish that is substantially free of striations, and an open neck portion extending from the body portion. In an embodiment, the container is comprised of polyethylene terephthalate (PET); the base portion includes a support portion and a substantially elevated portion having a center and a major diameter; and the center is disposed an elevated distance above said surface that is less than about 0.05 the major diameter. A method and apparatus for extrusion blow molding an article is also disclosed.

DETAILED DESCRIPTION OF EMBODIMENTS

Figure 1:
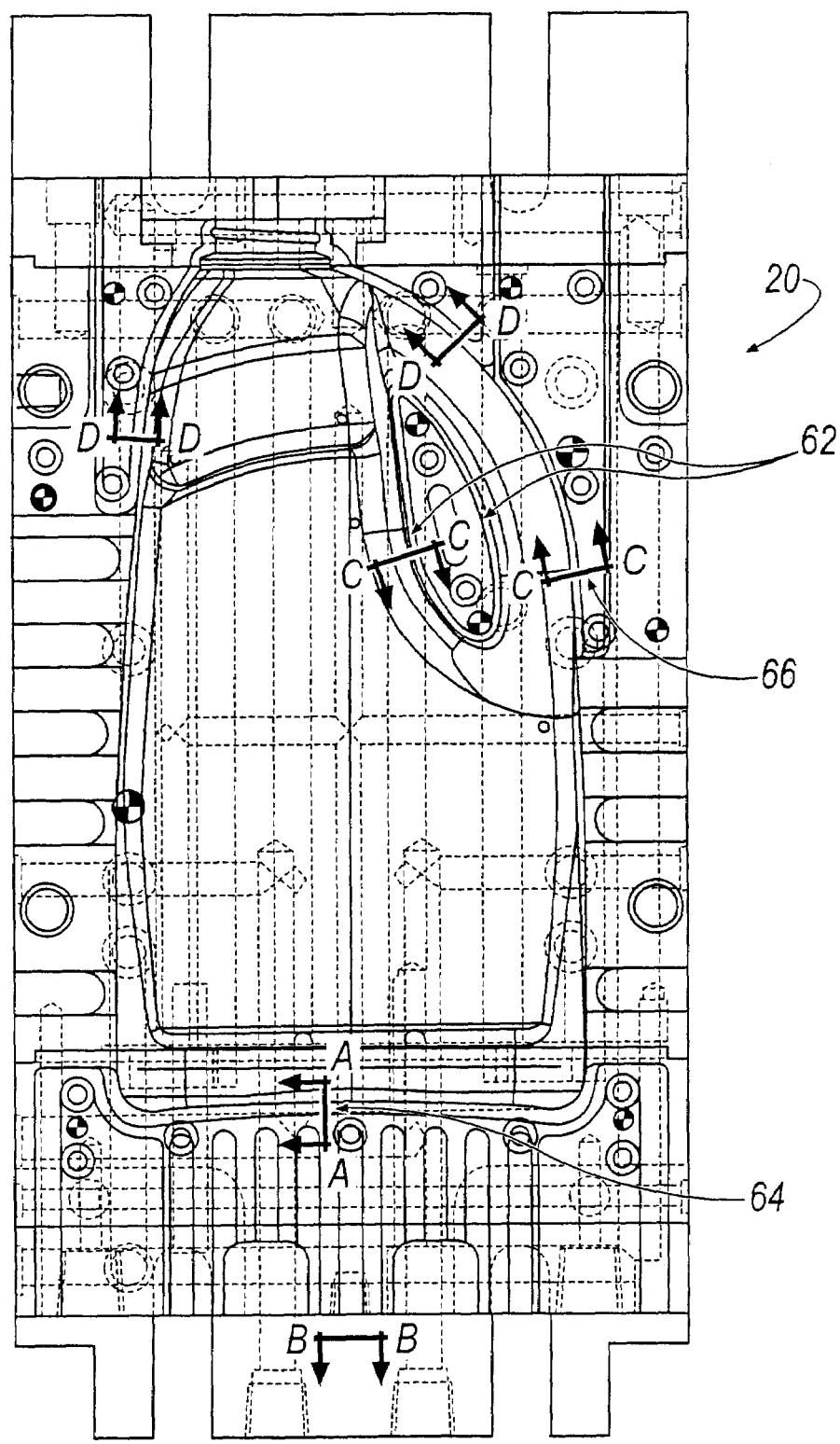
FIG. 1 is a side elevation view of an illustrative mold assembly for a container.

Referring to FIG. 1, a side view of a mold assembly 20 for producing a container in accordance with an embodiment of the present invention is shown. The illustrated mold assembly 20 is configured to produce a container 30 of the type, for example, as generically illustrated in FIGS. 2A through 2C.

FIGS. 3, 4, 5 and 6 represent partial mold halves for the top, front, bottom, and rear portions, respectively, of the mold assembly 20 illustrated in FIG. 1. It should be noted that the invention is not limited to a container 30 of the type and form illustrated in FIGS. 2A through 2C, however, and may instead embody a multitude of other shapes and product configurations, including those without handles and those with one or more handles or grasping features.

Figure 2A:
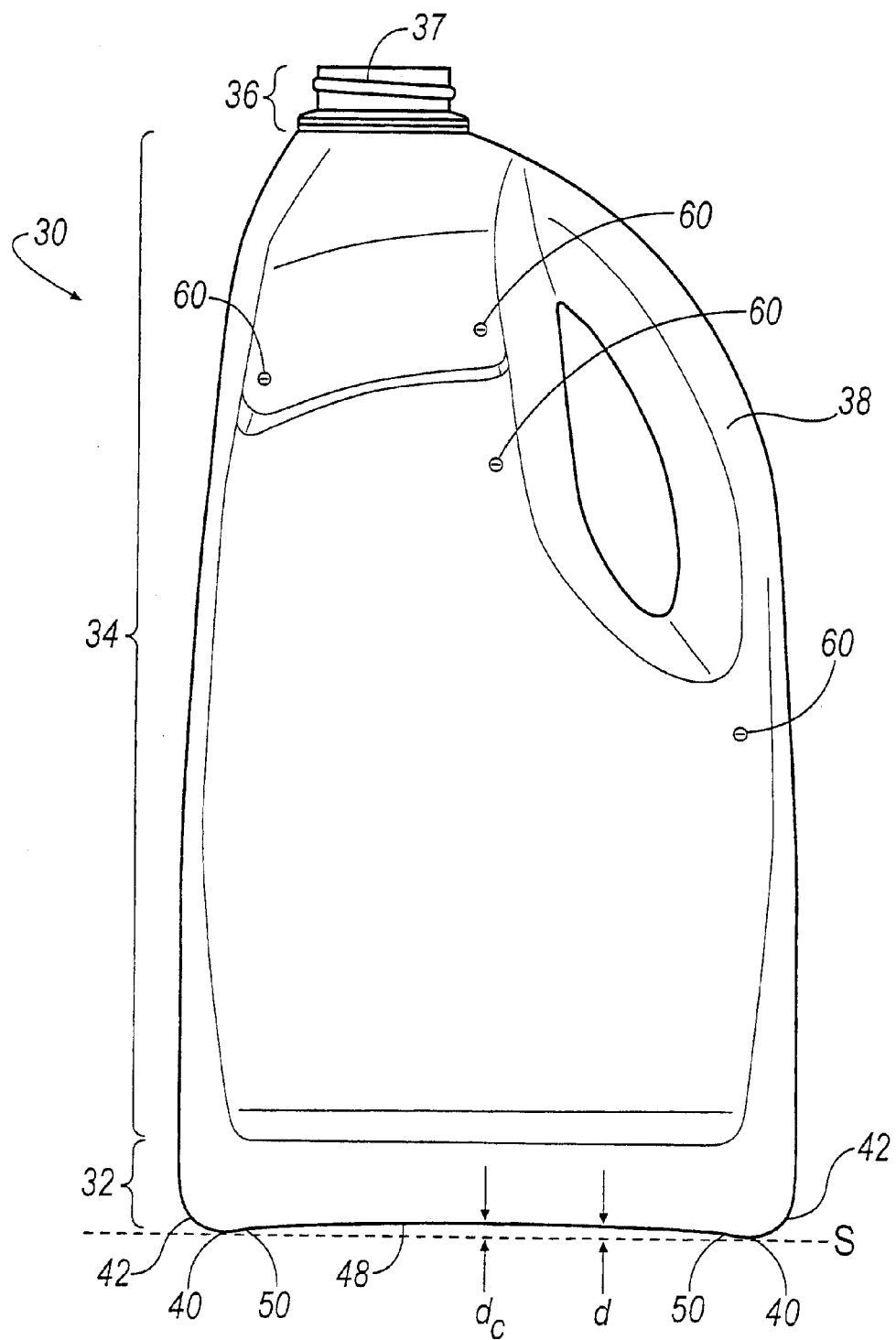
FIG. 2A is a side elevation view of an embodiment of a container of the type generally produced from the illustrative mold assembly of FIG. 1.

Turning to FIG. 2A, a container 30 is constructed in accordance with an embodiment of the invention. The container 30 includes a closed base 32 providing support for the container 30 upon a surface (generally designated S); a body portion 34 positioned vertically above the base 32; and an open neck portion 36 positioned above the body portion 34. If desired, the neck portion 36 may further include closure attachment formations such as threads 37. Further, the container 30 may also optionally include one or more (preferably hollow) handling formations—such as handle 38 shown included with the body portion 34 in FIG. 2A.

For purposes of illustration, but without limitation, in the side view shown in FIG. 2A, the base 32 contacts the associated surface S at several points or ranges of points to generally define a surface contact portion 40. In an embodiment, the contact positions 40 are adjacent to rounded or curved transition segments or areas 42, which do not generally contact surface S when the container 30 is left in a freestanding position on the surface. As necessary or as desired, the transition segments or areas 42 may be configured to provide improved mold separation and material distribution.

Figure 2B:
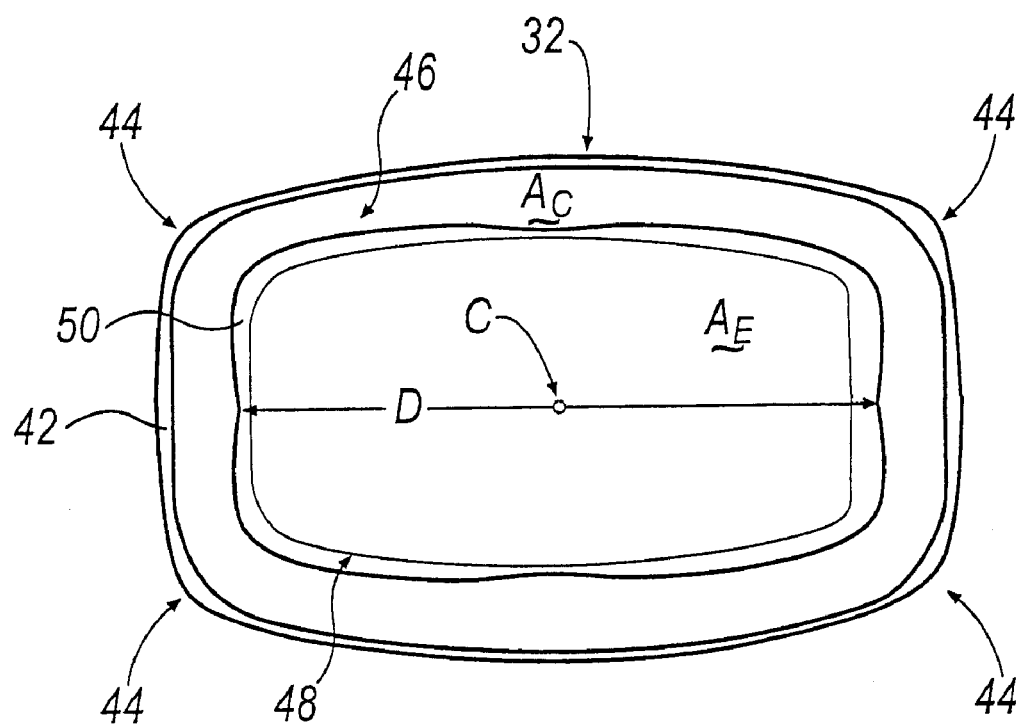
FIG. 2B is a bottom plan view of the container shown in FIG. 2A.

A bottom plan view of the base 32 is shown in FIG. 2B. In the sample base depicted, the base 32 has a generally rectangular planar configuration (as viewed from the surface looking upward toward the bottom of the container). In one embodiment, the corners 44 are at least slightly or partially curved or rounded. However, the invention is not limited to the embodiment illustrated, and the base may instead embody a number of other cross-sectional configurations, including, without limitation, configurations that are substantially cylindrical, oval, or square.

Moreover, base 32 includes a support portion, generally referred to in the illustrated embodiment as 46, which physically contacts the surface S when the container 30 is in its normal supported position. Support portion 46 has a bottom plan view contact area, for example, as generally designated $A_C$ in FIG. 2B. In the same view, an elevated portion 48 is shown having a bottom plan view area that is generally designated $A_E$ and a center identified as C. Center C substantially coincides with the center of the bottom plan view area of the elevated portion $A_E$. In the depicted embodiment, the elevated portion 48 includes a transition segment or transition portion 50 that provides a region for transition between the support portion 46 and the elevated portion 48. The transition portion 50, which may include a perpendicular, partially slanted or angled segment, typically includes a relatively smooth radius or curvature at or about the point where the transition portion 50 meets or merges into the support portion 46.

The elevated portion 48 includes a length that passes through the center C from one end of the elevated portion $A_E$ to the other (and includes transition portions 50 prior to meeting the associated contact portion 46). The greatest such length is designated as the major diameter D. For the generally rectangular base portion shown in FIG. 2B, the major diameter D will generally be a diagonal. In the case of container with a circular base, the major diameter D will simply be the diameter of the elevated portion 48 of the base.

In an embodiment of the container 30, excepting the transition portion 50, the elevated portion 48 is substantially flat or is comprised of segments or portions having a substantially shallow angle (typically with a rise of less than about 5 degrees) relative to the support surface S (e.g., as illustrated in the side view of FIG. 2A). In such embodiments, the elevated portion 48 is parallel or substantially parallel to the plane formed by the support surface S at or in proximity of the center C of the elevated portion 48.

The distance from the center C of the elevated portion 48 to the support surface S, when measured in normal, unfilled standing position, is illustrated, as distance $d_C$ in FIG. 2A. In an embodiment of the invention, the distance $d_C$ is less than about 0.05 times the length of the major diameter D. With such a configuration, under certain conditions, the center C of the elevated portion may contact the support surface S without significant damage to the integrity of the base of the container.

Additionally, the entire container or portions of the container, such as the base, may be heat set. Because the elevated portion 48 of the base 32 is not stretched (for example as it would commonly be with stretch-blow-molding operations), the elevated portion 48 does not have a reflex shape that it is biased to return to. Moreover, for hot-fill-type applications, ridges, ribs, or other formations may be added to the container 30 to improve heat resistance and to generally stiffen portions of the container.

Moreover, in an embodiment (i) the majority of the elevated portion 48, excluding the transition portion 50, is positioned a distance (generally designated in FIG. 1 as d) from about 0.25 inches to about 0.50 inches above the surface S contacted by the support portion 46 and (ii) the bottom plan view contact area $A_C$ is less than about 0.75 of the bottom plan view elevated area $A_E$. Moreover, the inclusion of a substantially "flat," relatively low (compared to the support surface S) "pushed-up" or elevated area (such as area $A_E$ illustrated) has been shown to provide improved drop impact for a number of container configurations—particularly compared to those having a high-arched elevated portion as part of their base design.

Figure 2C:
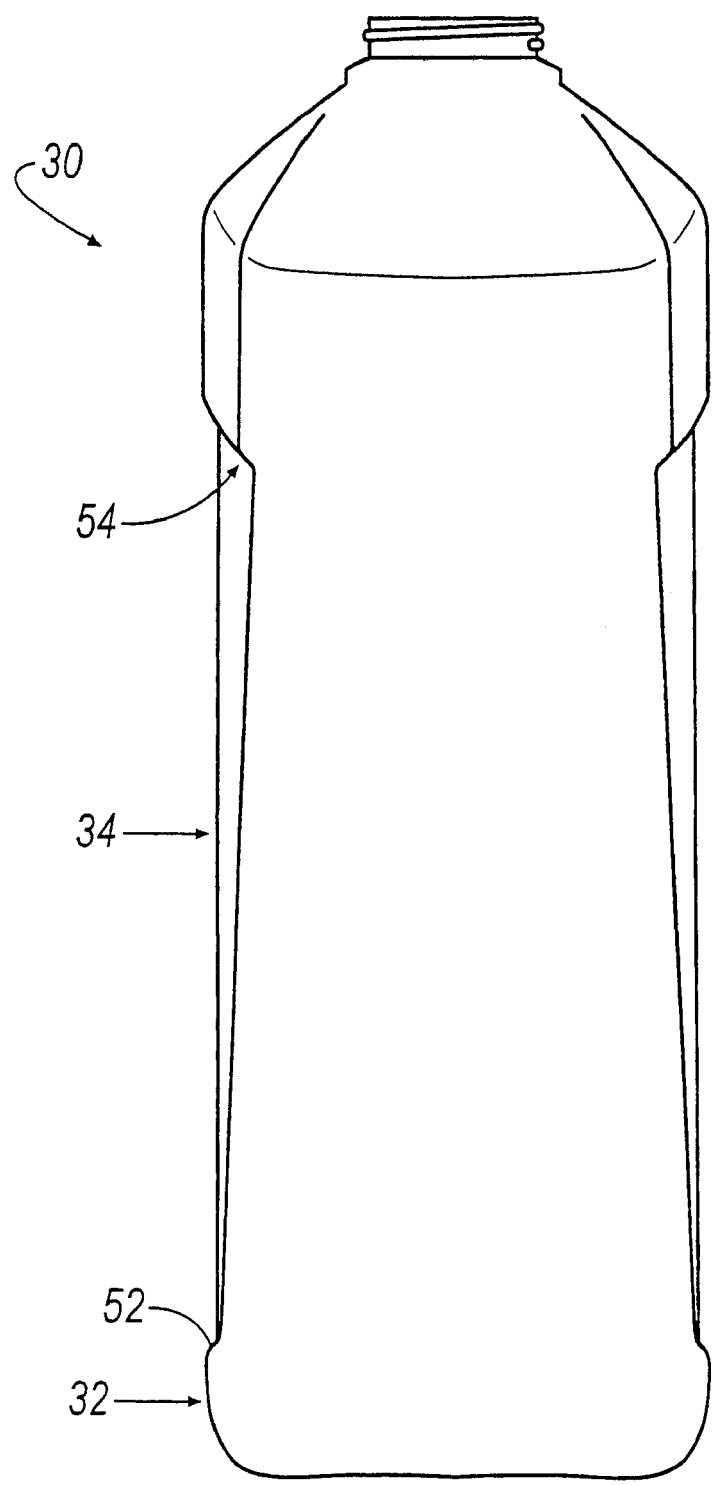
FIG. 2C is a front elevation view of the container shown in FIG. 2A.
Figure 3:
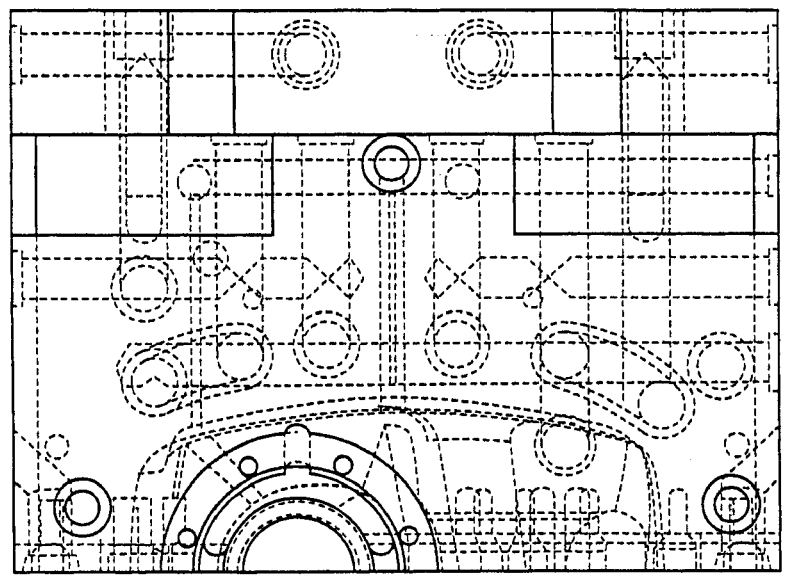
FIG. 3 is a partial top view of the mold assembly shown in FIG. 1.
Figure 5:
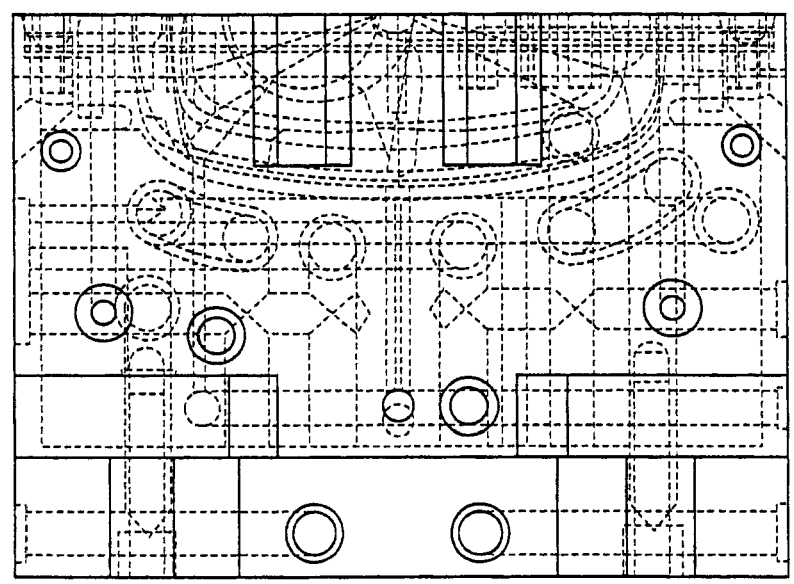
FIG. 5 is a partial bottom view of the mold assembly shown in FIG. 1.
Figure 4:
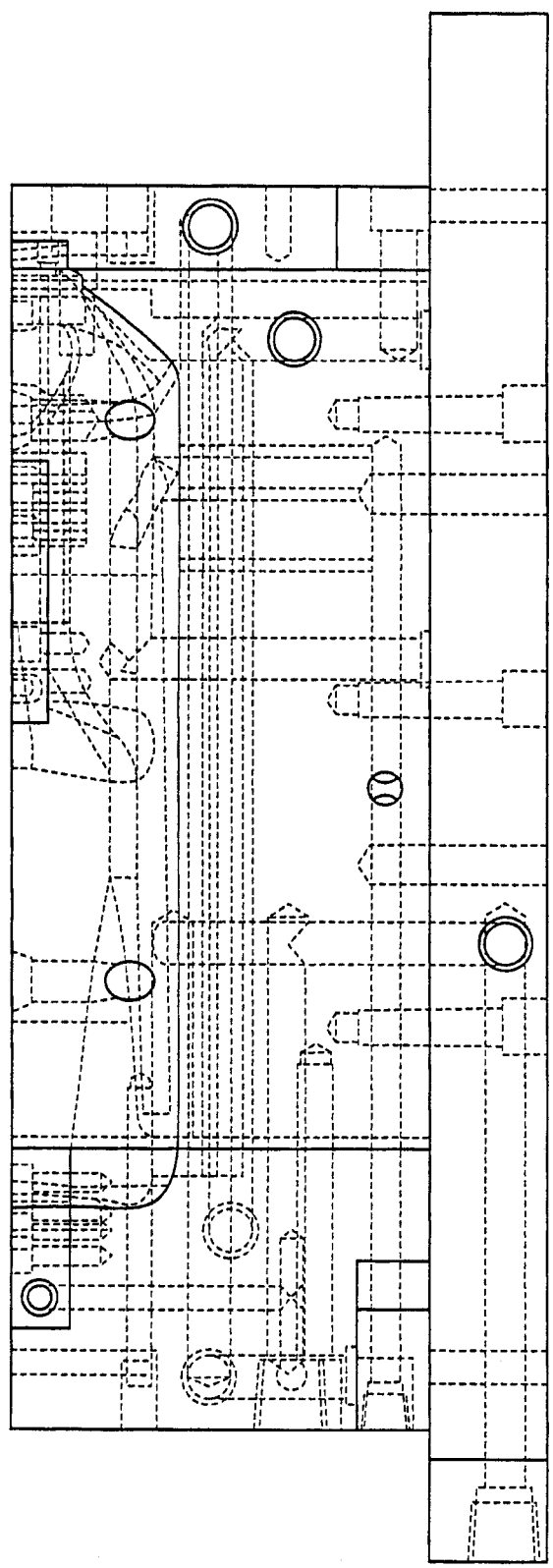
FIG. 4 is a partial front view of the mold assembly shown in FIG. 1.
Figure 6:
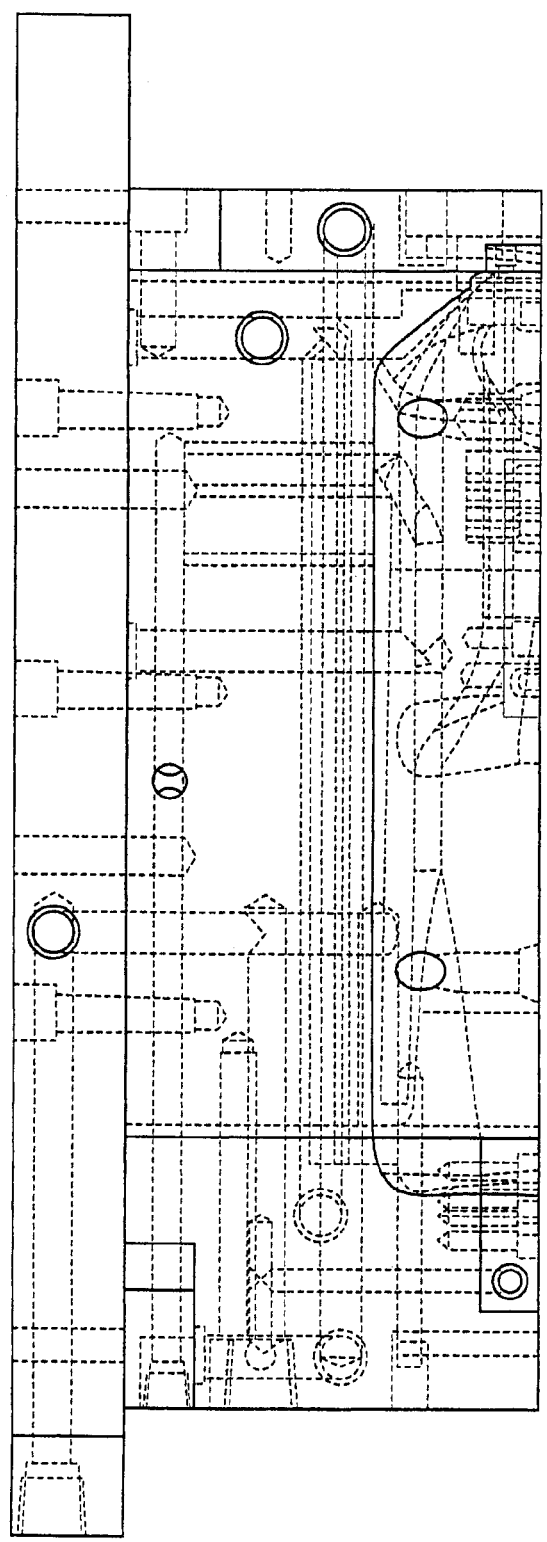
FIG. 6 is a partial rear view of the mold assembly shown in FIG. 1.

As perhaps best illustrated in FIG. 2C, the base 32 may optionally include a ridge 52 that provides a transition from the base 32 into the body portion 34. Ridge 52 preferably extends inwardly to contact the body portion 34 and includes a radius of curvature therebetween that better permits substantially consistent material distribution. Further, if desired, the body portion may also include one or more ridges or formations, such as the upper ridge 54 illustrated.

The container is comprised of plastic and is preferably comprised of polyethylene terephthalate (PET), which can include standard commercial-grade PET resins. In a preferred embodiment, the container is comprised of PET having an intrinsic viscosity (IV) greater than 0.96 and, more preferably, greater than 0.98. Further, if desired, container 30 may be comprised of virgin PET, recycled or post-consumer PET, blends of PET, or multi-layered combinations of virgin, blended and/or recycled PET.

The present invention further includes an improved method for extrusion blow molding PET articles, such as containers, which may include handles or "handleware" and may exhibit improved or desirable characteristics. The improved methods include novel techniques which will be discussed in further detail.

Extrusion blow molded containers are formed in connection with a plurality of mold portions. As previously noted, FIGS. 3, 4, 5, and 6 illustrate portions of mold halves that can be used to produce a container in accordance with an illustrative embodiment of the present invention. The opposing mold halves will generally be mirror images of the mold halves illustrated; however, that is not a requirement. Further, PET is considered to be a relatively "hard" material to work with, consequently, in a preferred embodiment, the molds and inserts are comprised of stainless-steel or a metal with similar characteristics to provide sufficient function and durability.

Moreover, in an embodiment of the invention, the head of the plastic extruder is coated with a material comprised of metallic coating. An example of a coating that may be used is a material called EXCALIBER which is comprised of XYLAN 8200 series two coat black metallic coating, however, other polymer plastic coating or coatings may be used.

Additionally, the associated molds are preferably sandblasted with a relatively fine material such as fine glass bead, which for example, may be polished to a 600 radial wipe. The sandblasting creates "venting" in the mold which allows air adjacent to the surface to flow and be better moved. Air that is "trapped," for example, is generally not desirable and can cause recesses or "dents," surface "striations" (such as surface streaks or imperfections that are generally attributable to the molds, as opposed to the extruder), or other undesirable surface characteristics. With improved movement due to the sandblasting, air is less likely to be trapped in pockets during the molding operation and formation of the article's surface. Moreover, the sandblasting of the mold may be done selectively, for example but without limitation, in corners where air is more likely to become trapped. Factoring in a sufficient amount of venting better produces a light glass bead and more venting in the mold will typically provide an article with a smoother, more "glass-like" and substantially clear or transparent surface finish.

In addition to the aforementioned sandblasting procedure, mold vents (generally labeled 60 in the illustrative FIG. 1) may be strategically added to the mold to help provide further improved venting. The illustrated embodiment of the mold portions show a plurality of such mold vents, however, the invention is not limited to the precise number and placement illustrated and more or less vents may be provided.

It has generally been observed that PET as it is cooled does not want to generally flow or move well, particularly when compared to other plastic materials. Therefore, the present inventive method includes consideration for certain changes associated with the positioning and geometry of the associated mold "pinch-offs." In an embodiment of the present invention, one or more, and preferably a plurality of, "raised pinches" are included with the associated molds and are preferably comprised of stainless steel (or a material having similar functional characteristics for molding). Among other things, raised pinches can aid in the removal of flash. Moreover, the pinches can be selectively incorporated at strategic positions, for instance, to help remove "shallows" and better distribute the material in a desired configuration. For example, as illustrated in an embodiment of the present invention, raised pinches are included at the handle eye (designated as position 62), the tail flash (designated as position 64), and the outer side of the handle (designated as position 66). While such raised pinches can be of the type and form used in connection with the molding of polyethylene (PE) articles, the sharp point associated with the present invention is preferably in the neighborhood of about 3/1000ths of an inch higher than the rest of the mold. Use of such raised pinches at select positions can further help to provide improved handing for the articles in addition to improved structural integrity and characteristics.

The present invention further discloses the use of modified mold pinch portions. Examples of modified geometries associated with the pinch-offs, including those pertaining to the angle eyes and compression lands, are perhaps best illustrated in connection with FIGS. 1 and 7 through 11.

Figure 7:
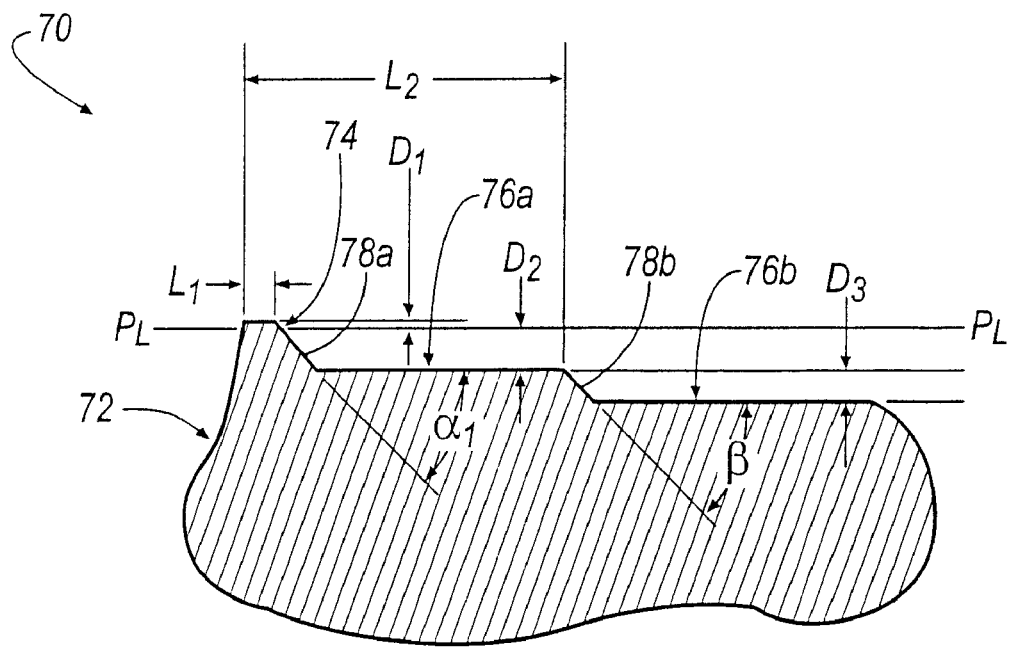
FIG. 7 is a view of the bushing half only taken at section A-A of FIG. 1.

FIG. 7 depicts a bushing half only, shown taken at section A-A of FIG. 1. Bushing half 70 includes a cavity portion 72, a raised pinch 74 and one or more compression lands, generally shown as 76a and 76b. In a preferred embodiment, raised pinch 74 extends substantially flat and level (relative to the associated parting line) along a length $L_1$ at a distance $D_1$ above the parting line (designated as PL). Raised pinch 74 is located above an adjacent compression land 76a, which extends for a length $L_2$. By way of example, but without limitation, $L_1$ may be about 0.010 inches ±0.0015 inches; $L_2$ may be about 0.150 inches ±0.005 inches; and $D_1$ may be about 0.003 inches ±0.0005 inches.

In an embodiment, compression lands 76a and 76b have uppermost surfaces that are also substantially parallel to the parting line and are further "stepped," such that compression land 76a is "dropped" a distance $D_2$ below the parting line PL and 76b subsequently "drops" a further distance $D_3$ below the level of compression land 76a. Compression lands 76a, 76b further include transition segments, 78a and 78b, respectively, which are preferably sloped or otherwise provide a sufficiently smooth transition between the associated portions. In the exemplary embodiment, transition segments 78a and 78b are shown steadily sloped at angles $\alpha_1$ and $\beta$. By way of illustration only, $D_2$ may be about 0.020 inches, $D_3$ about 0.015 inches, and transition segments 78a, 78b may be sloped at angles $\alpha_1$ and $\beta$ that are about 45 degrees ±3 degrees, respectively.

Figure 8:
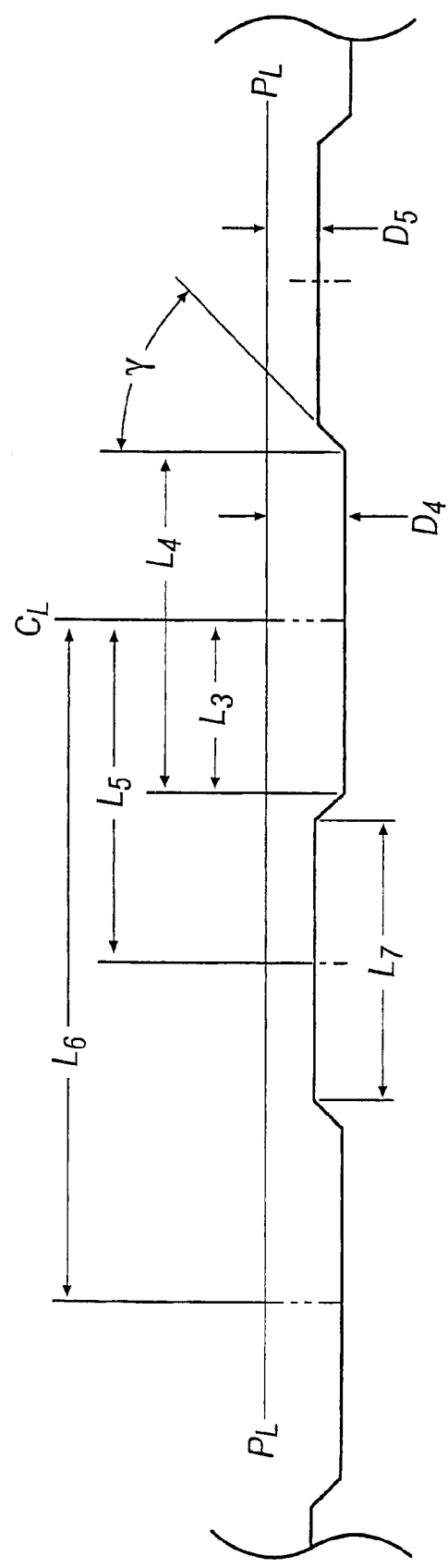
FIG. 8 is a view of the bushing half only taken at section B-B of FIG. 1.

FIG. 8 shows the bushing half only (relevant to the illustrative container shown in FIG. 2A) shown taken relative to section B-B of FIG. 1. The center line CL and parting line PL are illustrated and provide positional reference and orientation. In the exemplary embodiment, the following elements may have the following lengths and/or distances: $L_3$ about 0.125 inches; $L_4$ about 0.250 inches; $L_5$ about 0.250 inches; $L_6$ about 0.500 inches; $D_4$ about 0.056 inches; and $D_5$ about 0.035 inches. Further, the transitional angle, generally depicted as $\gamma$, is typically about 45 degrees ±a few degrees.

Figure 9:
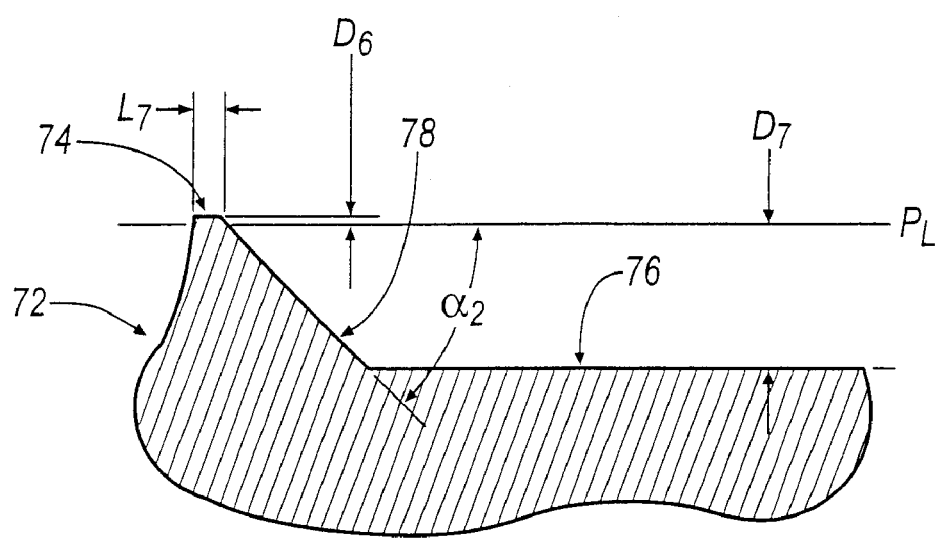
FIG. 9 is a view of both halves taken at section C-C of FIG. 1.

FIG. 9 illustrates the pinch-off associated with both halves taken at section C-C of FIG. 1. The illustrated pinch-off includes a cavity portion 72, a raised pinch 74 and a compression land, generally shown as 76. In a preferred embodiment, raised pinch 74 extends substantially flat and parallel along a length $L_7$ at a distance $D_6$ above parting line PL. Adjacent compression land 76 is located at a distance $D_7$ below the parting line PL. The compression land includes a transitional segment 78 that generally slopes at an angle $\alpha_2$, relative to the associated parting line PL. In the exemplary embodiment, $L_7$ may be about 0.010 inches ±0.0015 inches; $D_6$ may be about 0.003 inches ±0.0005 inches; and $D_7$ may be about 0.070 inches ±0.005 inches.

Figure 10:
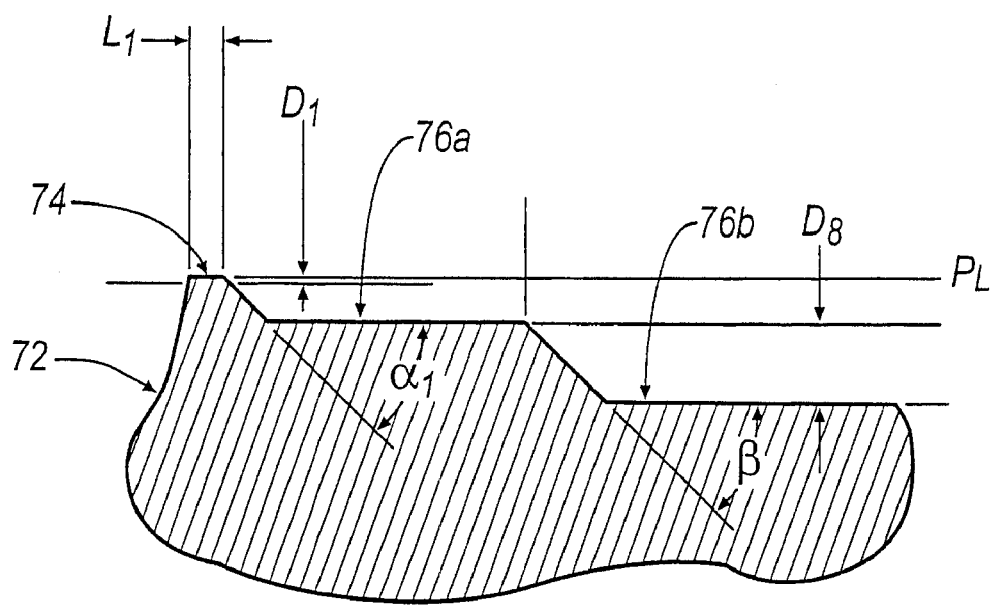
FIG. 10 is a view of the pin half only taken at section A-A of FIG. 1.

Turning next to FIG. 10, a view of the pin half only taken at section A-A is illustrated. The pin half includes a cavity 72, a raised pinch-off 74 and first and second compression lands 76a, 76b, as generally illustrated in connection with FIG. 7. A number of the elements associated with FIG. 10 have similar geometries and dimensional characteristics to corresponding elements associated with FIG. 7. The primary distinction between FIGS. 7 and 10, is that the illustrated distance $D_8$ in FIG. 10 may be greater, for example, about 0.036 inches.

Figure 11:
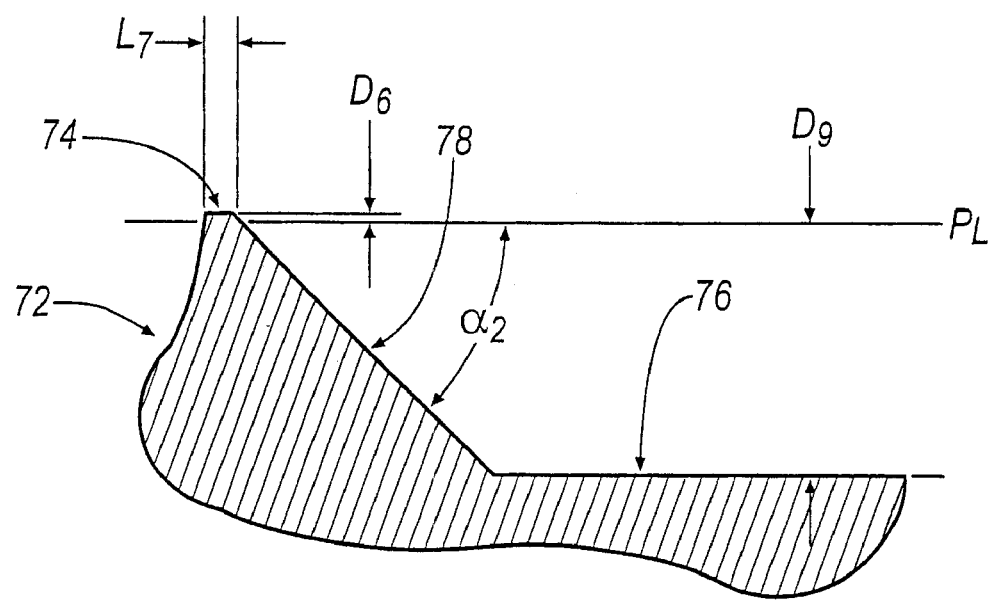
FIG. 11 is a view both halves taken at section D-D of FIG. 1.

The pinch edge section illustrated in FIG. 11 shows both halves as they generally appear at section D-D of FIG. 1. The halves include a cavity 72, raised pinch-off 74, and compression land 76. As with the correspondence between FIGS. 7 and 10, there are a number of geometric and dimensional similarities between FIG. 11 and FIG. 9. The primary distinction being the increased distance $D_9$ between the parting line PL and the compression land 76.

A spin-trimming operation is commonly employed relative to the neck portion of the articles to provide better handling and cycle time as will as to better impart improved structural integrity. If desired, additional "heat-setting" may be included with the processing of the articles.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. An apparatus for extrusion blow molding a container comprised of polyethylene terephthalate, comprising:
   an extruder;
   an extruder head coated with a surface coating; and
   a mold set configured to form a container having a base for supporting the container on a surface, a body portion extending from the base, and an open neck portion extending from the body portion, wherein at least a portion of the mold set has a fine-glass-bead surface finish, the mold set includes a parting line and a raised pinch-off, and the pinch-off includes a raised surface portion that extends at least 0.0025 inches beyond the parting line of the mold set.

2. The apparatus as recited in claim 1, wherein the coating is comprised of a metallic coating material.

3. The apparatus as recited in claim 2, wherein the coating is comprised of a two-coat black metallic coating material.

4. The apparatus as recited in claim 1, wherein the coating is comprised of a polymer plastic coating material.

5. The apparatus as recited in claim 1, wherein a surface finish of the mold is at least partially sandblasted.

6. The apparatus as recited in claim 5, wherein the surface finish is sandblasted with a fine material.

7. The apparatus as recited in claim 6, wherein the surface finish is sandblasted with a fine glass bead.

8. The apparatus as recited in claim 7, wherein the surface finish is polished to a 600 radial wipe.

9. The apparatus as recited in claim 5, wherein the sandblasted surface finish creates venting in the mold to permit air adjacent to the surface to flow.

10. The apparatus as recited in claim 5, wherein the surface finish is sandblasted in selected locations.

11. The apparatus as recited in claim 5, wherein corners of the mold set are sandblasted.

12. The apparatus as recited in claim 5, wherein the mold set includes a sandblasted surface finish having a factored amount of venting.

13. The apparatus as recited in claim 1, wherein the mold set includes a mold vent.

14. The apparatus as recited in claim 13, wherein the mold set includes a plurality of mold vents.

15. The apparatus as recited in claim 1, including a plurality of raised pinch-offs.

16. The apparatus as recited in claim 1, wherein the mold set is configured to produce a container with a base having a substantially flat and non-circular elevated portion.

17. An apparatus for extrusion blow molding a container comprised of polyethylene terephthalate, comprising:
    an extruder;
    an extruder head coated with a metallic surface coating; and
    a mold set configured to form a container having a base for supporting the container on a surface, a body portion extending from the base, and an open neck portion extending from the body portion;
    wherein at least a portion of the mold set is sandblasted and has fine-glass-bead surface finish, and the mold set includes a plurality of mold vents and a plurality of raised pinch-offs, the pinch-offs including a raised surface portion that extends at least 0.0025 inches beyond the parting line of the mold set.

18. An apparatus for extrusion blow molding a container comprised of a polymer, comprising:
    an extruder;
    an extruder head coated with a surface coating; and
    a mold set configured to form a container having a base for supporting the container on a surface, a body portion extending from the base, and an open neck portion extending from the body portion, wherein at least a portion of the mold set has a sandblasted, fine-glass-bead surface finish, the mold set includes a parting line and a raised pinch-off, and the pinch-off includes a raised surface portion that extends at least 0.0025 inches beyond the parting line of the mold set.

19. The apparatus as recited in claim 18, wherein the coating is comprised of a metallic coating material.

20. The apparatus as recited in claim 18, wherein the mold set includes a plurality of raised pinch-offs.

21. The apparatus as recited in claim 18, wherein the mold set includes a plurality of mold vents.

22. The apparatus as recited in claim 18, wherein the base includes a raised substantially flat and non-circular elevated portion.

* * * * *